Dec. 23, 1969    J. F. CLARKE    3,485,995
BONDING OF METALS TO FORM COMPOSITES
Filed Nov. 7, 1966    2 Sheets-Sheet 1

John F. Clarke,
Inventor,
Koenig, Senniger, Powers and Leavitt,
Attorneys.

United States Patent Office 3,485,995
Patented Dec. 23, 1969

3,485,995
BONDING OF METALS TO FORM COMPOSITES
John F. Clarke, Attleboro, Mass., assignor to Texas Instruments Incorporated, Dallas, Tex., a corporation of Delaware
Filed Nov. 7, 1966, Ser. No. 592,473
Int. Cl. B23k 9/00, 9/02, 11/00
U.S. Cl. 219—117                    4 Claims

ABSTRACT OF THE DISCLOSURE

Three lengths of metal materials are directed to converge angularly into the nip space between pressurizing draw rolls to be squeezed each to each for peripherally cladding two of the lengths composed of one metal around the other length as a core composed of another metal. A high-frequency alternating current is applied to the members of at least one but not all pairs of the lengths, so as to produce differential heating and different temperatures of converging pairs of them to be bonded.

---

This invention relates to the bonding of metals to form composites, and with regard to certain more specific features, to the bonding of continuous lengths of metals in the form of wires, rods, tubes, ribbons and the like to produce lengths of composites having improved bonds.

Among the several objects of the invention may be noted the provision of improvements upon bonding processes such as set forth in U.S. Patent 2,753,623 whereby the preheating of lengths of materials to be bonded is more efficiently performed; the provision of such preheating which permits of differential heating of parts to be bonded; and the provision of a preheating process which may be carried out with simple low-cost apparatus and by means of which a better composite is obtained. Other objects and features will be in part apparent and in part pointed out hereinafter.

The invention accordingly comprises the constructions, products and methods hereinafter described, the scope of the invention being indicated in the following claims.

In the accompanying drawings, in which several of various possible embodiments of the invention are illustrated, FIG. 1 is a side elevation diagrammatically illustrating apparatus for carrying out one form of the invention;

Figure 1:
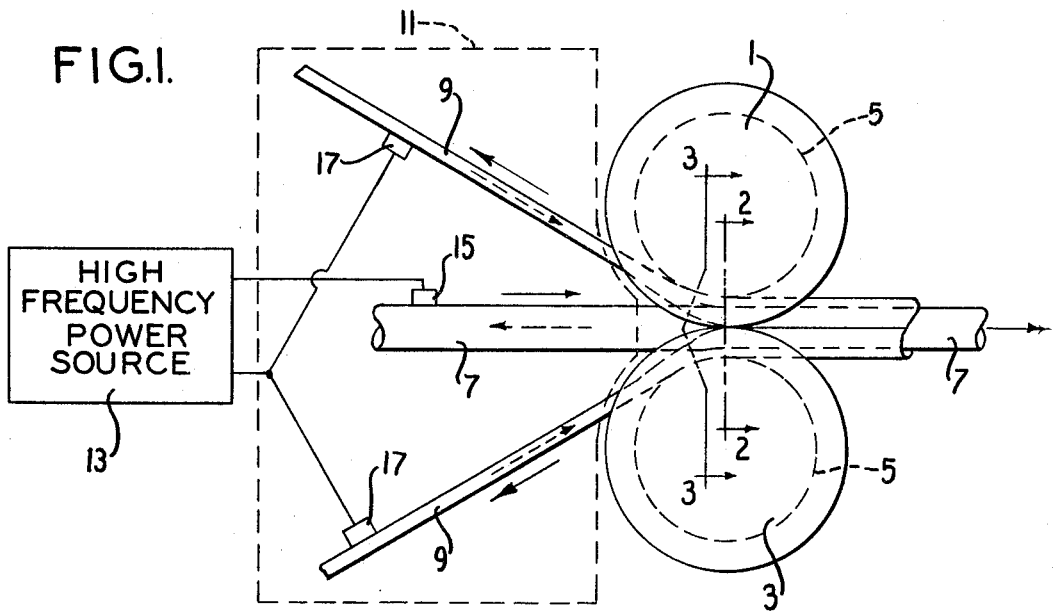

Corresponding reference characters indicate corresponding parts throughout the several views of the drawings. Each solid arrow at the right-hand end of core 7 indicates direction of motion. All other solid-line arrows indicate one instantaneous direction of flow of high-frequency A.C. current. Dotted-line arrows indicate reverse instantaneous direction of flow of high-frequency A.C. current.

Solid-phase bonding processes such as set forth in said patent are known for producing composites such as multilayered strips, clad wires, rods, tubes and the like. Such processes minimize the amount of physical reduction by compression of the composite components by a certain amount of heating prior to the reduction step upon which the bonding process depends. The present invention relates to an improved means for effecting the required heating, which according to the present invention is carried out by the use of high-frequency electric current.

Figure 2:
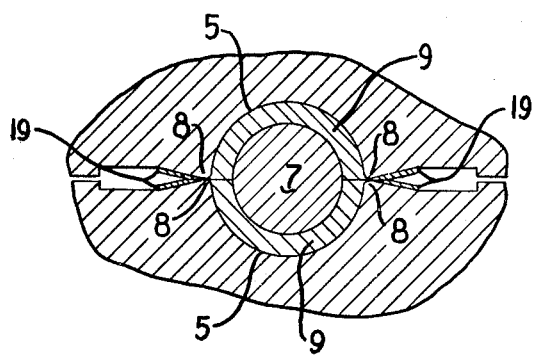
FIG. 2 is an enlarged cross section taken on line 2—2 of FIG. 1.
Figure 3:
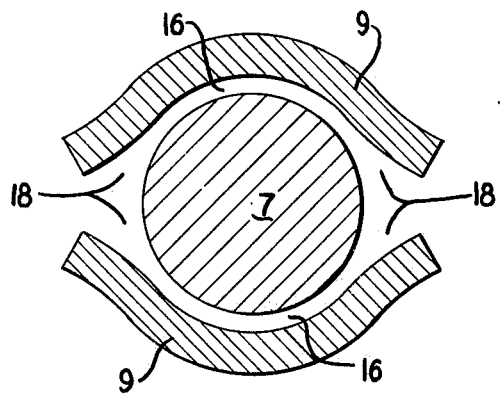
FIG. 3 is an enlarged cross section taken on line 3—3 of FIG. 1.

Referring now more particularly to FIG. 1, there is shown at numerals 1 and 3 a pair of rolls of a conventional rolling mill, the peripheries of which are oppositely grooved as at 5. The grooves are located between shoulders 8. The grooves and shoulders accept therebetween continuous lengths of a clean metal core rod 7 located between lengths of bent clean cladding metal strips 9. The grooves 5 and shoulders 8 are so shaped that as the strips 9 pass through the nip space between the rolls they will be transversely bent around the core 7, preliminarily as shown in FIG. 3 and finally as shown in FIG. 2, with sufficient squeezing pressure between the rolls to effect bonding. The engaging surfaces of components 7 and 9 are sufficiently clean, as taught by said patent, and are so maintained by surrounding them as they approach the rolls with an inert or reducing atmosphere. A retort for an inert or reducing atmosphere for the purpose is illustrated by the dotted lines 11. Heating of the components 7 and 9 is preferably carried out at least in part as these components pass through the retort 11. As taught by said patent, by raising the temperatures of the components 7 and 9 as they enter between the rolls 1 and 3 the amount of reduction for an adequate bonding effect can be substantially reduced with considerable saving in power to operate the mill of which rolls 1 and 3 are a part.

Referring again to FIG. 1, there is shown at numeral 13 a high-frequency A.C. power source which is electrically connected with the core 7 by means of a brush 15 and to both strips 9 through brushes 17. Thus, high-frequency A.C. current flows back and forth in opposite directions in the core component 7 on the one hand and in the cladding components 9 on the other hand. A useful frequency of the A.C. source 13 for efficient solid-phase bonding may be, for example, 500 kilocycles per second or more.

When a high-frequency current such as above referred to is passed through a conductor, the flow tends to be concentrated on the surface of the conductor. When such high-frequency is passed in opposite directions in two conductors in sufficiently close proximity to one another, the current flow and consequent heating will be concentrated at the surfaces of the conductors which are closest to one another. Thus as the components 7 and 9 come together at the pinch region in the roll nip the heating effect of the current will be highly concentrated between surfaces just as they engage. As a result the temperature that is desired as the components 7 and 9 are squeezed together in the roll nip is obtained under conditions of high heating efficiency.

Figure 4:
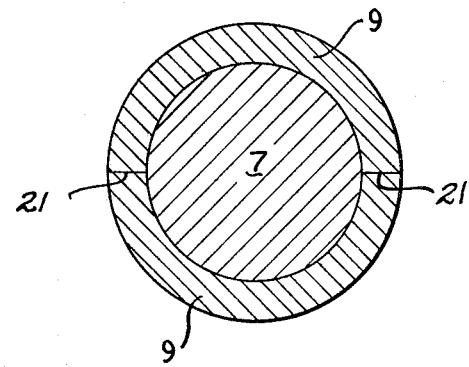
FIG. 4 is an enlarged cross section of one form of a composite product made according to the invention.

Referring to FIG. 3, it will be seen that the strips 9 become preliminarily arched crosswise as they approach the core 7. Based upon the connections shown in FIG. 1, the flow of current in each of the strips 9 will be opposite to the flow of current in the core 7. Since initially the spaces indicated at 16 between the strips and the core are smaller than the spaces indicated at 18 between the edges of the strip and the core 7, most of the heating and the highest temperatures will first occur at 16. Then as the spaces 18 close up as the components 9 are forced around the core 7, concentrations of heat will build up in these regions as the components come into contact. As the components leave the rolls the squeezed solid-phase bonded conditions shown in FIG. 2 are obtained. The cross section of the final product as shown in FIG. 4 is obtained by conventionally skiving off the waste fins 19 indicated in FIG. 2. The skiving process, being known, is not illustrated. By varying the power input of the high-frequency current, temperatures can be obtained as required for solid-phase bonding or fusion-bonding in the liquid phase between the components 7 and 9.

Figure 5:
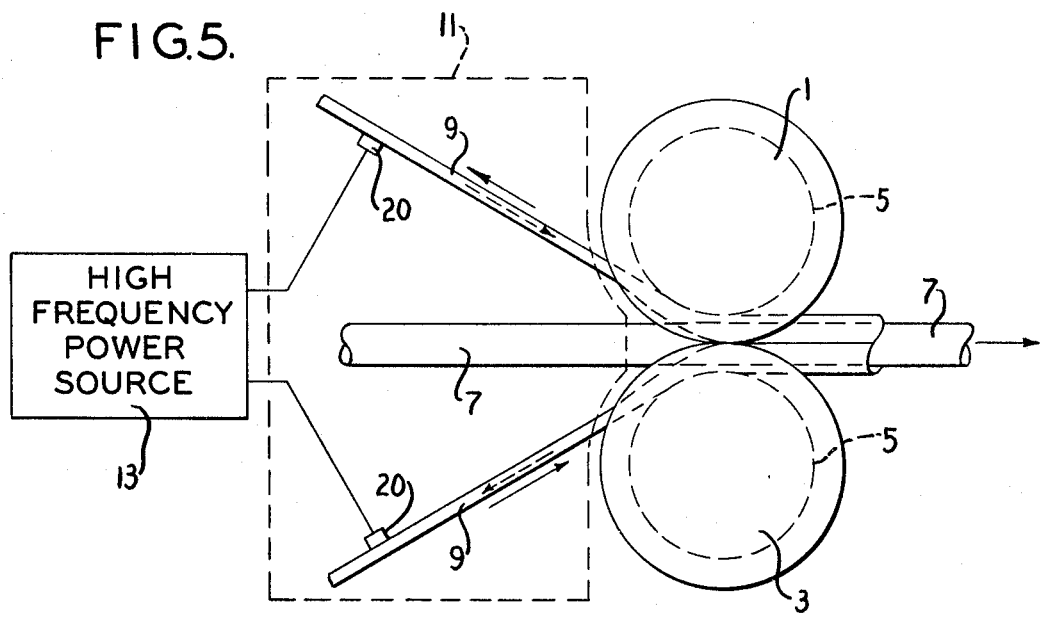
FIG. 5 is a view similar to FIG. 1 illustrating another form of the invention.

In FIG. 5 is illustrated another form of the invention in which like numerals designate like parts. In this case, the connections from the high-frequency power source 13 are made through brushes 20 such that no current flows through the core 7 but simply oppositely only in the cladding strips 9. In this event as the margins of the strips are bent together (FIG. 3), they come into close proximity. Thus most of the heat will be concentrated where these margins are squeezed together and finally bonded (FIG. 4). Enough power input may be used to effect a green bond over the interfaces between the cladding strips 9 and the core 7 and also between the edges of the cladding strips. By increasing the power input sufficiently, the bonds effected between the strip margins 21 in FIG. 4 can be effected by a fusion bond in the liquid phase while at the same time a solid-phase bond is obtained between the strips 9 and the core 7. This is due to the differential heating effects of the A.C. current in the strips 9 as they come together.

The invention may also be carried out by omitting the core 7 from the arrangement shown in FIG. 5, in which event a tubular product can be produced from strips such as 9 fed between rolls 1 and 3. In such case the strips 9 are buckled into the grooves upon compression between shoulders 8, at their margins. Arrangements whereby this may be accomplished are known, as disclosed in the United States patent application Ser. No. 391,944, filed Aug. 25, 1964 by Kenneth B. Clark, now abandoned.

It will be understood that where solid-phase bonds are mentioned herein that they may be so-called green bonds. It is known that such bonds may be improved by employing a heating or sintering step after completion of the green bond and the use of such a step is contemplated as required.

It will be understood that two strips such as 9 might be brought together between straight-faced rolls without the interposition of a core such as 7 but with current connections as illustrated in FIG. 5. In this event, a bonded flat composite ribbon-like product would be obtained.

In general, conductive strips such as 9 and cores such as 7 are metallic. For example, core 7 might be composed of steel and the strips 9 of aluminum. Other combinations of metals are not precluded. However, it is sufficient that the components such as 7 and 9 be conductive, and hence other materials are not precluded.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:
1. The method of bonding at least two lengths of metal cladding marginally to one another and also around and to at least one length of core-forming material, comprising
    selecting the core metal to be different from the metal of the two lengths of cladding,
    contacting said cladding and core lengths each to each by axially moving them to converge angularly into the nip space between draw rolls with the core length between the cladding lengths,
    squeezing said lengths each to each by the rolls in said nip space,
    establishing a flow of high-frequency alternating electric current axially in instantaneously opposed directions in converging members of at least one but not all pairs of said lengths at their regions of entry into the nip space, said opposed directions of axial flow through the members of said one pair effecting concentration of current and heating on their surfaces at the nip space thereby to produce a temperature different from that between the members of at least one other pair of said lengths at the nip space and through which said alternating current does not flow in instantaneous opposite directions.

2. The method according to claim 1, wherein said axial flow of current is applied serially through the two members of each of two pairs of said lengths, each of said two pairs consisting of one length of the cladding and the length of the metal core.

3. The method according to claim 1, wherein said current is applied serially through the two lengths of the cladding.

4. The method according to claim 1, wherein steel is selected for the core material and aluminum for the cladding material.

References Cited

UNITED STATES PATENTS

| | | | |
|---|---|---|---|
| 2,647,981 | 8/1953 | Wogerbauer | 219—67 |
| 2,753,623 | 7/1956 | Boessenkool et al. | 29—497.5 |
| 3,132,234 | 5/1964 | Wogerbauer | 219—67 |
| 3,220,107 | 11/1965 | Clark | 29—474.1 |
| 3,319,040 | 5/1967 | Rudd | 219—107 |
| 3,320,666 | 5/1967 | Dion | 29—473.3 |
| 3,349,212 | 10/1967 | Morris et al. | 219—67 |
| 3,359,402 | 12/1967 | Rieppel | 219—117 |
| 3,372,465 | 3/1968 | Frieling | 29—474.1 |
| 3,375,344 | 3/1968 | Kohler et al. | 219—107 |

JOSEPH V. TRUHE, Primary Examiner

W. DEXTER BROOKS, Assistant Examiner

U.S. Cl. X.R.

219—107